United States Patent
Stengele et al.

(10) Patent No.: US 6,761,518 B2
(45) Date of Patent: Jul. 13, 2004

(54) MACHINE TOOL

(75) Inventors: Gerald Stengele, Ludwigsburg (DE);
Thomas Hoffman, Ingersheim (DE);
Waldemar Haus, Stuttgart (DE)

(73) Assignee: Hüller Hille GmbH, Ludwigsburg (DE)

( * ) Notice: Subject to any disclaimer, the term of this patent is extended or adjusted under 35 U.S.C. 154(b) by 0 days.

(21) Appl. No.: 10/233,094

(22) Filed: Aug. 28, 2002

(65) Prior Publication Data
US 2003/0049088 A1 Mar. 13, 2003

(30) Foreign Application Priority Data

Sep. 11, 2001 (DE) .......................................... 101 44 541
Apr. 10, 2002 (EP) .............................................. 02007979

(51) Int. Cl.[7] ................................................. B23C 1/02
(52) U.S. Cl. .................... 409/235; 409/201; 414/744.4;
414/917; 74/490.07; 74/490.09; 74/479.01;
310/12
(58) Field of Search ................................ 409/235, 201,
409/204, 216, 86, 107, 109; 33/1 M; 414/744.4,
917; 74/471 XY, 479.01, 490.1, 490.09,
490.12, 490.08, 490.07; 901/23–24, 41;
248/652; 310/12–14

(56) References Cited

U.S. PATENT DOCUMENTS

| 4,962,676 | A | * | 10/1990 | Vainstock ................... 74/490.1 |
| 5,378,282 | A | * | 1/1995 | Pollard ......................... 901/23 |
| 5,701,042 | A | * | 12/1997 | Takei ........................... 310/12 |
| 5,808,382 | A | * | 9/1998 | Ira et al. ........................ 310/12 |
| 5,903,125 | A | * | 5/1999 | Prentice et al. .......... 74/471 XY |
| 5,916,328 | A | * | 6/1999 | Pritschow et al. ........ 74/490.03 |
| 5,945,824 | A | * | 8/1999 | Obara et al. ................... 310/12 |
| 6,012,884 | A | | 1/2000 | Azema |
| 6,099,217 | A | * | 8/2000 | Wiegand et al. ............. 409/201 |
| 6,157,157 | A | * | 12/2000 | Prentice et al. .......... 414/744.4 |
| 6,161,992 | A | * | 12/2000 | Holy et al. .................. 409/201 |
| 6,328,510 | B1 | | 12/2001 | Hanrath et al. |
| 6,402,444 | B1 | * | 6/2002 | Wang et al. ................. 409/235 |
| 6,575,676 | B2 | * | 6/2003 | Wang et al. ................. 409/201 |
| 2003/0005786 | A1 | * | 1/2003 | Stuart et al. ............. 74/490.08 |

FOREIGN PATENT DOCUMENTS

| DE | 019525482 A1 | * | 1/1997 |
| DE | 019614641 A1 | * | 10/1997 |
| DE | 198 06 085 | | 4/1999 |
| EP | 0 861 990 | | 9/1998 |
| WO | WO 00/76704 | | 12/2000 |

OTHER PUBLICATIONS

Tooling & Production, "Visions or Hexapods Danced in Their Heads Plus Other Technical Breakthroughs at EMO, Too", pp. 1–4 copyright 1998.*

* cited by examiner

Primary Examiner—A. L. Wellington
Assistant Examiner—Erica E Cadugan
(74) Attorney, Agent, or Firm—McGlew and Tuttle, P.C.

(57) ABSTRACT

A machine tool for at least triaxial machining of work pieces comprises a column of the type of a casing with side walls. In an interior space, provision is made for a work spindle which projects into a working area and which is connected via couplers and hinges to a driving skid that is displaceably guided on each side wall straight in a y direction. The driving skids are displaceably guided on two guides which are spaced from each other in the z direction. Provided between the guides are linear motors, a first part of which is mounted on the driving skid and a second part on the side wall.

7 Claims, 3 Drawing Sheets

MACHINE TOOL

BACKGROUND OF THE INVENTION

1. Field of the Invention

The invention relates to a machine tool for at least triaxial machining of work pieces, comprising a column of the type of a casing, which has side walls, an interior space, and a front, which is open towards a working area; a work spindle, which is disposed substantially in the interior space, projecting in a z direction into the working area; a driving skid on each side wall, which is displaceably guided thereon straight in a y direction; couplers, which are articulated to the driving skids by hinges and which are connected to each other by a hinge and which carry the work spindle; and drives for the driving skids.

2. Background Art

A machine tool of the generic type is known from U.S. Pat. No. 6,328,510 B1, comprising a guide for a skid on the front turned towards the working area. Further details cannot be seen from this publication.

SUMMARY OF THE INVENTION

It is an object of the invention to embody a machine tool of the generic type such that reliable guidance and antitorsion actuation are obtained, accompanied with a compact design.

According to the invention, this object is attained by the features wherein the driving skids are displaceably guided on two guides that are spaced from each other in the z direction; and wherein the drives are linear motors which are disposed between the guides, a first part of the linear motors being mounted on the driving skid and a second part on the side wall. Arranging the guides and the linear drives, which lie between them, on the side of the side walls that is turned towards the interior space helps obtain anti-torsion guidance of the driving skids and direct transmission of the attraction powers of the linear drives onto the skids. All in all, this leads to a very rigid structure of the entire work spindle motion mechanism. The guides and the linear drives are positioned for ease of accessibility and assembly and disassembly. This is accompanied with a depth arrangement of the guides and drives within the column.

When the guides have two guide rails on the side of the side wall that is turned towards the interior space and open towards the interior space, and when guide shoes are mounted on the respective driving skid, enclasping the guide rails, this reflects an optimized embodiment of the guides. It is possible to integrate a safety mechanism wherein two guide shoes are disposed at a distance from each other on each guide rail, a brake shoe, which is mounted on the driving skid, being disposed between the two guide shoes.

A path measuring system, which is provided between a guide of each driving skid and the linear motor, may be integrated in the design according to the invention.

Further features, details and advantages of the invention will become apparent from the ensuing description of an exemplary embodiment, taken in conjunction with the drawing.

DESCRIPTION OF THE PREFERRED EMBODIMENT

Figure 1:
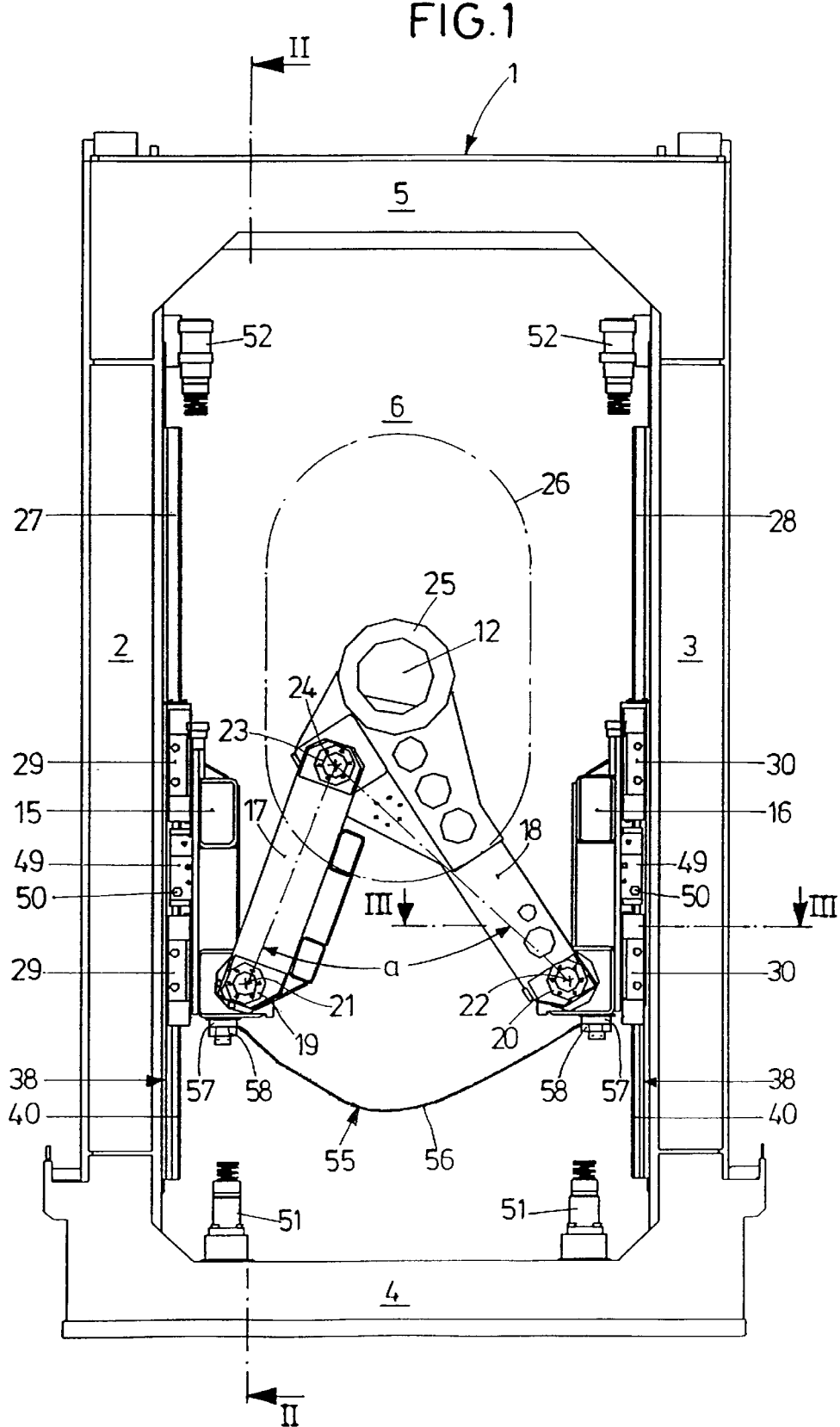
FIG. 1 is an elevation of the machine tool.
Figure 2:
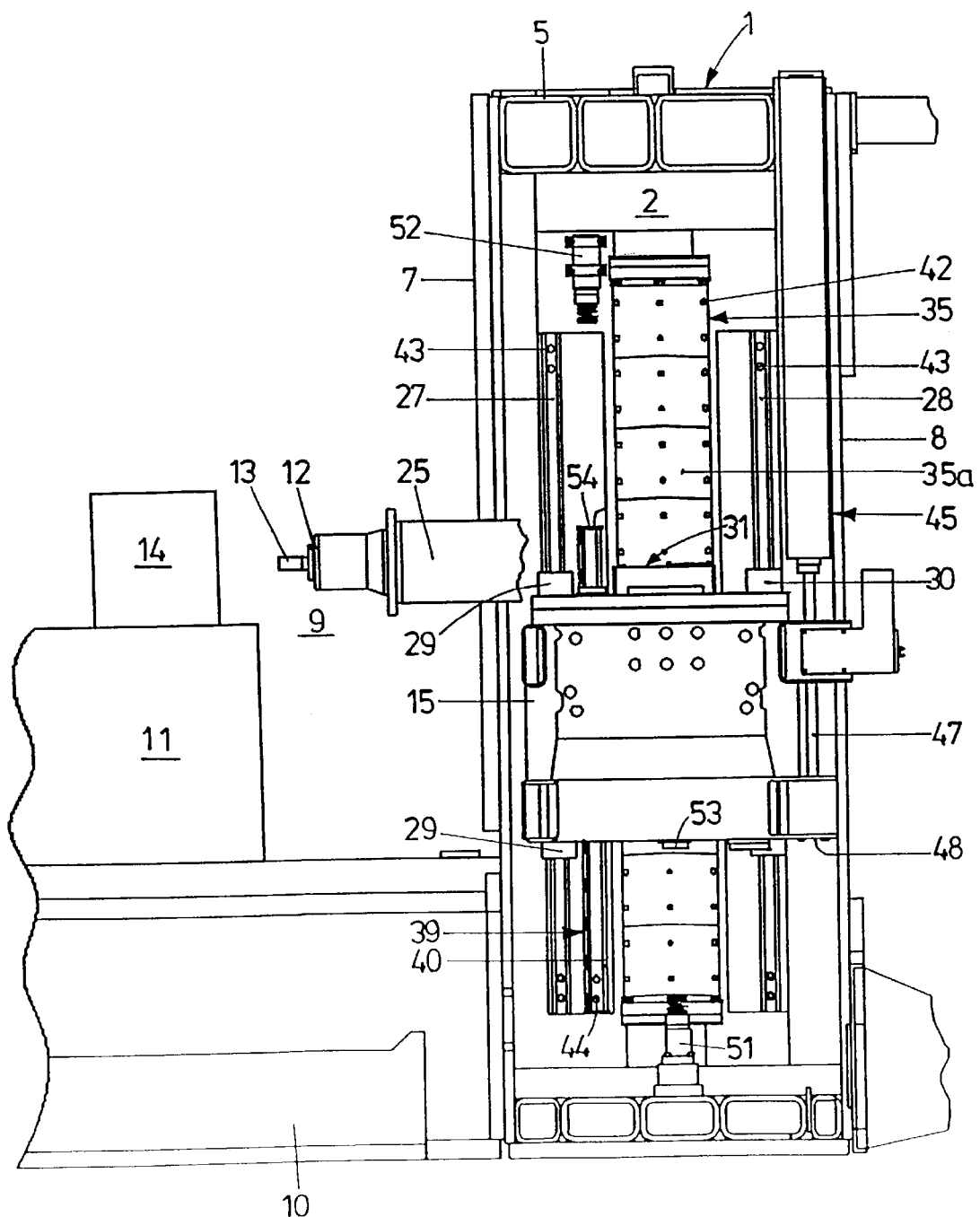
FIG. 2 is a vertical section through the machine tool on the line II—II of FIG. 1.
Figure 3:
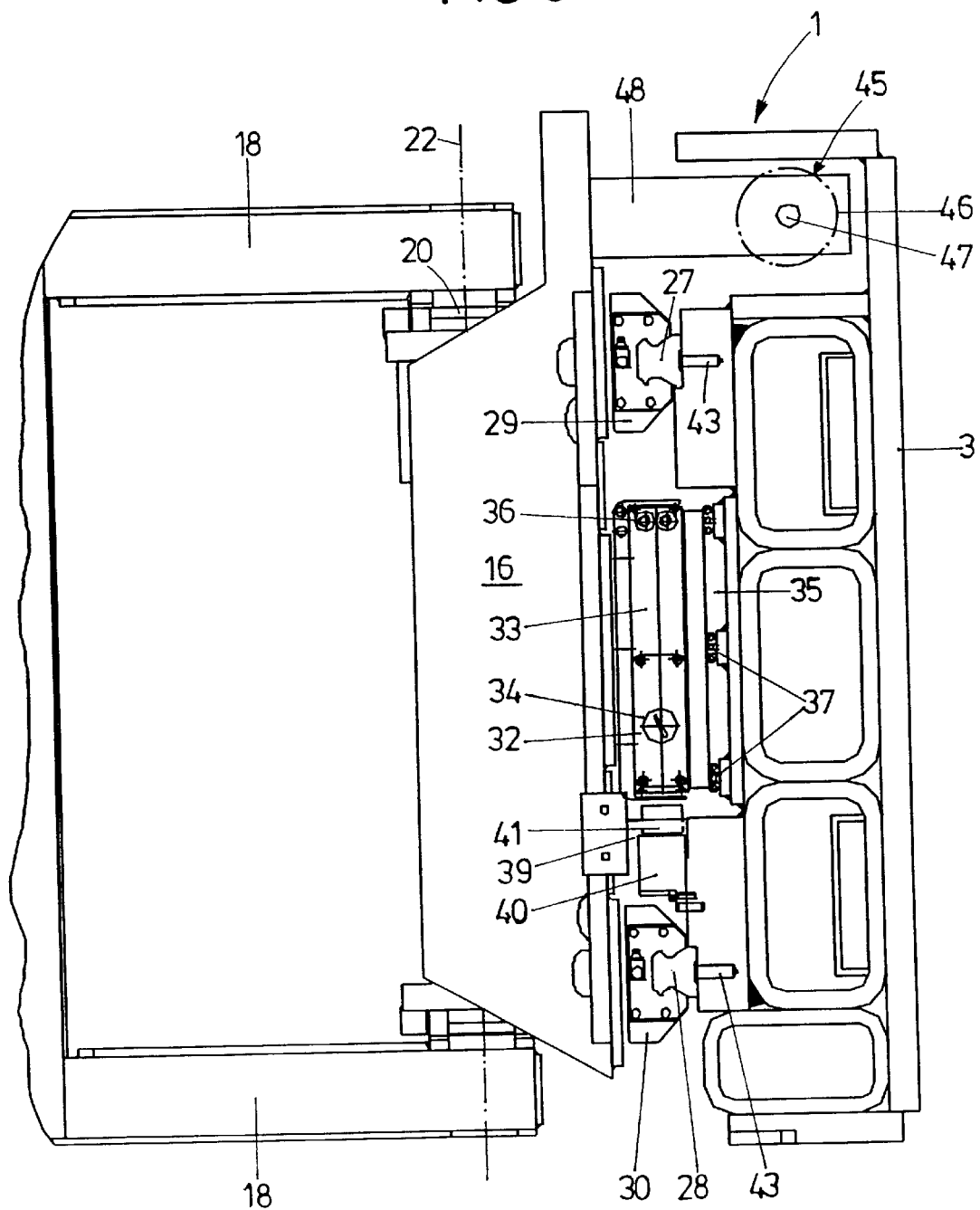
FIG. 3 is a horizontal partial section through the machine tool on the line III—III of FIG. 1.

The machine tool seen in the drawing for the at least triaxial machining of work pieces by a rotatably drivable tool comprises a parallelepiped column 1, which is composed of two vertical side walls 2, 3 parallel to each other, a bottom 4 and an upper part 5, connecting the side walls 2, 3 with each other. The column 1 encloses a so-called actuator space as an interior space 6 and is open at its two fronts 7, 8. A working area 9 is disposed before the front 7, where a work piece holder 11 (only roughly outlined) is arranged on a machine bed 10 that is joined to the column 1.

A work spindle 12 in the form of a motor spindle is provided in the interior space 6, projecting through the front 7 into the working area 1 and carrying a rotatably drivable tool 13 for machining a work piece 14 that is disposed on the work piece holder 11. Customarily, the front 7 is hidden by a cover (not shown) which moves along with any motions of the work spindle 12 in the horizontal x direction and the vertical y direction, which is however no supporting member of the column 1, but only serves to separate the working area 9 from the interior space 6. The work spindle 12 may be movable in the z direction that is vertical of the x-y plane; but it is just as well possible that the work piece holder 11 is movable in the z direction in familiar manner.

For moving the work spindle 12, two driving skids 15, 16 are provided, which are movable in the y direction and guided on the inside of the side walls 2, 3 and connected to each other by two couplers 17, 18. Each coupler 17, 18 is connected to the associated skid 15, 16 by means of a hinge 19, 20 that has an axis of rotation 21, 22 running in the z direction. The two couplers 17, 18 are again joined to each other by a hinge 23 with an axis of rotation 24 that runs in the z direction. A tubular work spindle support 25, with the work spindle 12 therein, is mounted on one coupler 18 in vicinity to the hinge 23. Due to the fact that the three axes of rotation 21, 22, 24 extend in the z direction and the skids 15, 16 in the y direction, the work spindle 12, upon displacements of the skids 15, 16, can be shifted parallel to itself in the x-y plane within a working range 26 that lies in this plane.

The couplers 17, 18, in combination with the driving skids 15, 16, are designed such that the angle a made by the couplers 17, 18 is modified only by a minor amount upon motion of the work spindle 12 into any position within the entire working range. This has the effect that the two couplers 17, 18 rigidify each other, which increases the rigidity of the coupler kinematics of the work spindle 12 as compared to other known machine tools, accompanied with simultaneous reduction of the moving mass. For this reason, any machining forces generated on the edge of the tool 13 will lead to some minor deflection of the work spindle 12. As compared to other known machine tools, this machine tool, the basic design of which is known from U.S. Pat. No. 6,328,510 B1 is able to carry out heavy machining jobs with simultaneously increased precision. Simultaneously, greater accelerations due to reduced mass help save nonproductive times.

The skids 15, 16 are displaceably guided on guide rails 27, 28 which are disposed at a distance from each other in the z direction on the inside of the side walls 2 and 3, respectively, to which end they are provided with guide shoes 29, 30 that enclasp the guide rails 27, 28. Combined with the guide shoes 29 and 30 that run on it, each guide rail 27, 28 constitutes a guide. Provided between each guide rail 27, 28 that is mounted on a side wall 2 and 3 and the corresponding guide shoes 29, 30, linear motors 31, 32 are provided as drives. The respective primary part 33 of each linear motor 31, 32 is mounted on the side turned towards the neighboring side wall 2 and 3 between the pairs of guide shoes 29, 30. Current supply of the primary parts 33 takes place via electric connectors 34 that are only roughly outlined. The secondary part 35 of each linear motor 31 and 32 which is allocated to each primary part 33 and formed by magnetic armatures 35a is provided on the respective side wall 2 and 3 between the guide rails 27, 28, which are disposed by twos at a distance from each other on the inside of the respective side wall 2 and 3. The primary part 33 and the secondary part 35 can be cooled by means of cooling devices 36, 37.

The position of each linear motor 31, 32 is detected by a path measuring system 38, 39. The path measuring systems 38, 39 are disposed between the respective linear motor 31, 32 and the guide 27, 29 and 28, 30, respectively, that is adjacent the working area 9. The ruler-type stationary portion 40 of each system 38, 39 is mounted on the associated side wall 2, 3, whereas the movable portion 41 in the form of a tracer is mounted on the respective skid 15, 16.

The secondary parts 35, the guide rails 27, 28, and the stationary portions 40 of the path measuring systems 38, 39 are mounted by screws 42, 43, 44 on the inside, open towards the working area 9, of the respective side wall 2 and 3, which provides for ease of accessibility and assembly and disassembly. The same applies to the primary parts 33, the guide shoes 29, 30 and the movable portions 41 of the path measuring systems 38, 39. Arranging the linear motors 31, 32 between the guides 27 to 30 results in a guidance of the skids 15, 16 of high torsional rigidity. Furthermore, the forces of attraction of the linear motor 31 and 32, respectively, can be transmitted directly to the associated skid 15 and 16, with the effect of only minor deformation of the skid 15 and 16. The rigid design of the skids 15, 16 as well as the favorable arrangement of the linear motors 31, 32 and of the path measuring systems 38, 39 work in favor of the control behavior of the machine tools and thus of the quality of machining.

Simple assembly is feasible for example by the primary parts 33 first being mounted on the respective skid 15 and 16 and by the skid 15, 16 then being placed on the respective guide rails 27, 28. Afterwards, the skid 15 and 16 is moved into an upper or lower extreme position and a part of the magnetic armatures 35a that form the secondary part 35 are screwed on the free area of the inside of the respective side wall 2, 3. Subsequently, the respective skid 15, 16 is moved into the other extreme position and then the other part of the magnetic armatures 35a is fastened.

For equilibration of the skids 15, 16, equilibration means 45 are provided in the side wall 2 and 3 of the column 1 substantially consisting of a gas spring 46 in the form of a piston cylinder unit, the piston rod 47 of which is mounted on a lower bracket 48 of the respective skid 15, 16. The gas spring 46 exerts an upward tensile force in the y direction on the respective skid, compensating the weight of the respective skid 15 and 16 with all the parts it carries. With the fact in mind that the couplers 17, 18 and the work spindle support 25, together with the work spindle 12, are movable also in the x direction, the weight that acts on the respective skid 15 and 16 during operation of the machine changes so that complete compensation of the weight forces does not take place by way of the equilibration means 45, which is however of no importance. In addition to serving for equilibration, the gas springs 46 may be used for moving the skids 15 and 16 during maintenance jobs by compressed-air supply and corresponding triggering being employed when the power supply of the linear motors 31, 32 has been switched off.

Further, a brake shoe 49 is disposed between the guide shoes 29, 30 that are allocated to a respective guide rail 27 and 28; it is likewise fastened by screws to the respective skid 15, 16. The brake shoes 49 are open during operation by compressed air; upon interruption of the power supply of the linear motors 31, 32, the brake shoes 49 are deaerated and close so that the skids 15, 16 are held onto the guide rails 27, 28 as though by a mechanical locking brake.

Allocated to the bottom 4 and the upper part 5, end-of-travel dampers 51, 52 are provided for each skid 15, 16, with corresponding stops 53, 54 on the respective skid 15 and 16 being allotted thereto. This helps ensure that these end-of-travel dampers 51, 52 work when one of the skids 15, 16 moves beyond the upper or lower maximum travel given by the control. Upon breakdown of the control or any other failure, it is conceivable that the distance of the two skids 15, 16 relative to each other in the vertical y direction becomes to great, as a consequence of which the work spindle 12 leaves the working range 26 in the horizontal x direction, the work spindle support 25 hitting against a side wall 2 or 3 inclusive of the parts mounted thereon. For this to be prevented, a distance limiter 55 is provided, which may for instance be a pliable belt 56 the ends of which are held on the underside of each skid 15, 16 by a presser plate 57 which is joined to the skid 15, 16 by screws 58. This pliable belt 56 is designed to have a rigidity such that, upon failure of the linear motors 31, 32, it will reduce or convert the kinetic energy of the entire moving mass in the x-y plane—possibly cooperating with the end-of-travel dampers 51, 52—without the work spindle support 25 or another moving part colliding with any mechanical boundary. Energy conversion can be considered to be put into practice in particular by flexible deformation of the belt 56, whereby the energy is stored as potential energy. The pliable belt 56 may consist of various materials. Preferably, use is made of a fabric belt of polyamide as known from load suspension means in materials handling technology. However these belts do not convert the entire absorbed energy into heat; rather, backspringing will occur at the end of such an emergency travel. The emergency travel is the travel of the work spindle support 25. In the case of such an emergency, the belt 56 experiences durable elongation and must be replaced.

What is claimed is:

1. A machine tool for machining of work pieces, the machine tool comprising:
    a column (1) of a casing type, having
        a first side wall and a second side wall (2, 3),
        an interior space (6), and
        a front (7), open towards a working area (9);
    a work spindle (12), which is disposed substantially in said interior space (6) projecting in a z direction into said working area (9);
    a first and a second driving skid (15, 16), one on said each side wall (2, 3), each skid being displaceably guided on the respective side wall parallel to the other and in a straight vertical y direction;
    a first and a second coupler (17, 18), each coupler being articulated to a respective driving skid (15, 16) by a hinge (19, 20), and said couplers being connected to each other by a common hinge (23) wherein one of said couplers carries said work spindle (12); and a first and a second driven each for a respective said driving skid (15, 16); each side wall further comprising a first and a second guide rail (27, 28) and a first and a second guide shoe (29, 30), wherein each driving skid (15, 16) is displaceably guided on said two guide rails (27, 28) of one of said side walls, the two guide rails on each side wall being spaced from each other in the z direction on a respective said side wall (2, 3) on a side thereof that is turned towards said interior space (6);

wherein each pair of said respective guide shoes (29, 30) is mounted on a respective said driving skid (15, 16), enclasping a respective pair of said guide rails (27, 28); and wherein each said drive is a linear motor (31, 32) having a first part (33) and a second part (35), each said respective linear drive motor is disposed between the guide rails (27, 28) of a respective pair of said guide rails and the guide shoes (29, 30) of a respective pair of said guide shoes, said first part (33) of each said linear motor (31, 32) being mounted on a respective one of the driving skids (15, 16) and said second part (35) of each said linear motor (31, 32) being mounted on a respective one of said side walls (2, 3).

2. A machine tool according to claim 1, wherein two said guide shoes (29, 30) are disposed at a distance from each other on each guide rail (27, 28), each said respective side wall (2, 3) further comprising a brake shoe (49), which is mounted on a respective one of said driving skids (15, 16), being disposed between said two guide shoes on each said guide rail.

3. A machine tool according to claim 1, further comprising a path measuring system (38, 39) provided between each pair of said guide rails on each said side wall (27, 28) and a respective one of said linear motors.

4. A machine tool according to claim 1, wherein each said second part (35) of a respective one of said linear motors (31, 32) and each said guide rail (27, 28) are connected from said interior space (6) onto a respective one of said side walls (2, 3).

5. A machine tool for machining of work pieces, the machine tool comprising:

a support structure with a longitudinally extending first wall and a longitudinally extending second wall, said first wall being spaced from said second wall and defining an intermediate space facing a working area;

a first guide system including first guide rails connected to said first wall and first shoes engaged respectively around said first guide rails;

a second guide system including second guide rails connected to said second wall and second shoes engaged respectively around said second guide rails, said first guide rails being provided substantially parallel to said second guide rails and running longitudinally defining a Y direction of a X-Y plane and perpendicular to a Z direction, said first guide rails of said first guide system being spaced apart in the Z direction and said second guide rails of said second guide system being spaced apart in the Z direction;

a first skid connected to said first shoes and movable with said first shoes along said Y direction;

an first independent linear motor drive disposed between said first guide rails of said first guide system and having a first skid connection part and a first wall connection part, said first skid connection part being connected to said first skid and said first wall connection part being connected to said first wall, said first skid being adjustably positionable along said first guide rails by said first independent linear motor drive;

a second skid connected to said second shoes and movable with said second shoes along said Y direction;

a second independent linear motor drive disposed between said second guide rails of said second guide system and having a second skid connection part and a second wall connection part, said second skid connection part being connected to said second skid and said second wall connection part being connected to said second wall, said second skid being adjustably positionable along said second guide rails by said second independent linear motor drive;

a first hinge;

a second hinge;

a first coupler connected by said first hinge to said first skid and being adjustable in the X-Y plane, said first coupler lying between said first guide system and said second guide system;

a second coupler connected by said second hinge to said second skid and being adjustable in the X-Y plane, said second coupler lying between said first guide system and said second guide system;

a common hinge connecting an end of said first coupler and an end of said second coupler; and a work spindle fastened to said second coupler in the vicinity of said common hinge and extending in the Z direction into the working area, said work spindle being moveable in the X-Y plane upon movement of said first coupler and said second coupler.

6. A machine tool according to claim 5, further comprising a first and a second brake means provided on said respective first and second skids.

7. A machine tool according to claim 5, further comprising a first and a second path measuring system provided within said first and second guide rails.

* * * * *